May 2, 1950 G. E. SLEEPER, JR., ET AL 2,505,998
VALVE
Filed Feb. 11, 1946 2 Sheets-Sheet 1
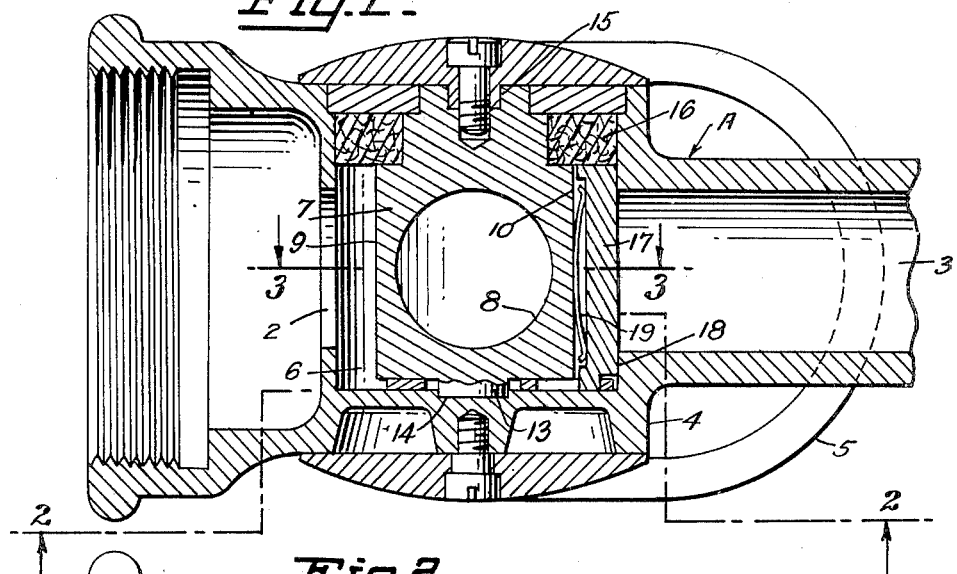
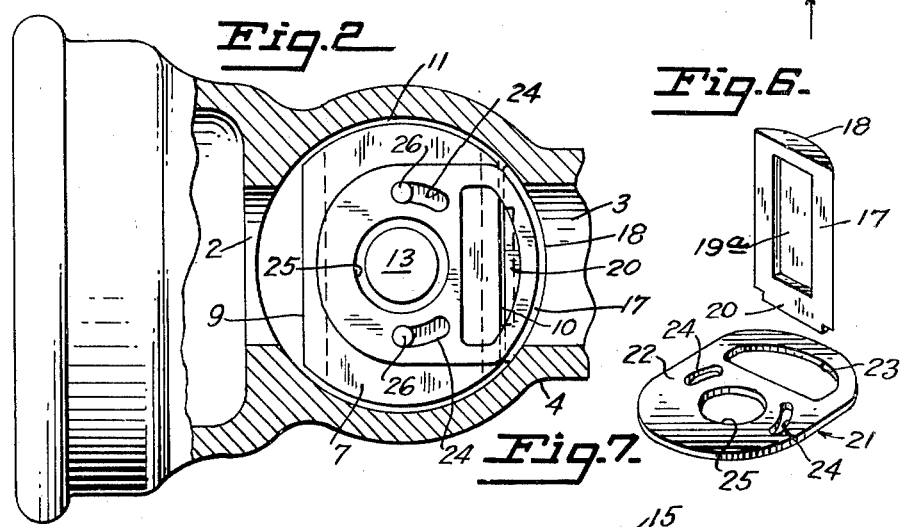
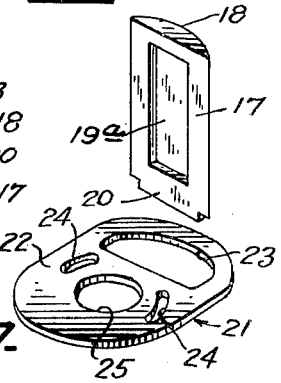
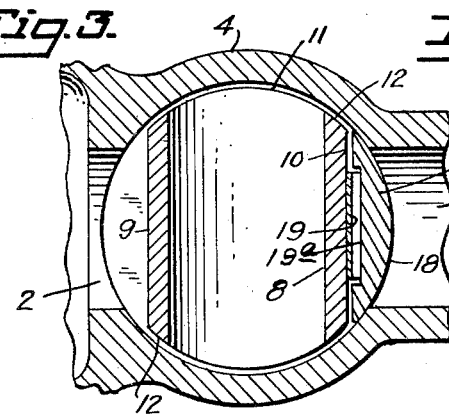
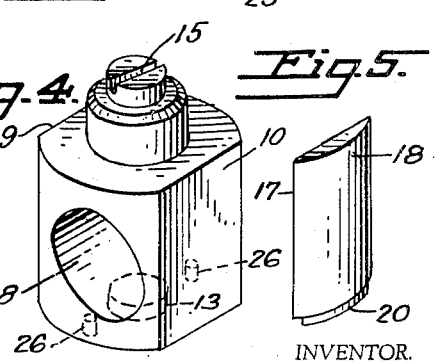
INVENTOR.
GEORGE E. SLEEPER, JR.
GORDON W. McPEAK
BY
Stephen S. Townsend
ATTORNEY

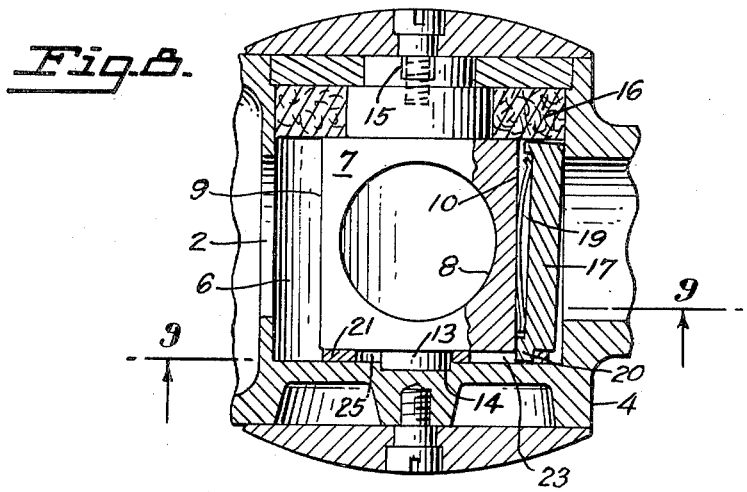
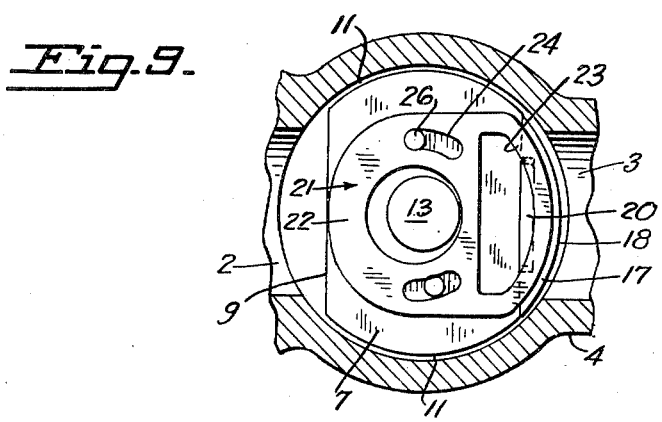
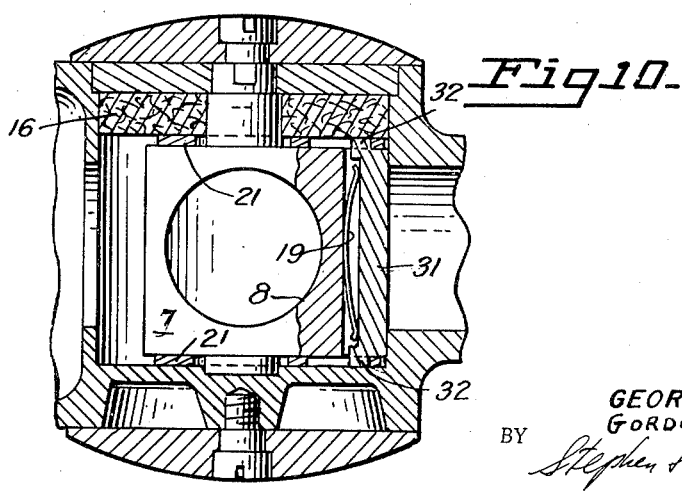

Patented May 2, 1950

2,505,998

UNITED STATES PATENT OFFICE 2,505,998

VALVE

George E. Sleeper, Jr., and Gordon W. McPeak, Berkeley, Calif.; said McPeak assignor to said Sleeper, Jr.

Application February 11, 1946, Serial No. 646,762

4 Claims. (Cl. 251—102)

This invention relates to valves, and more particularly to improvements in valves adapted for use in fire nozzles, and the like.

In present-day fire-fighting apparatus it is often desirable to operate a nozzle which is in flow communication with water, or the like, under very high pressure. It is necessary to be able to actuate the nozzle, i. e. open or close it, with a minimum of force and in a positive and controlled fashion.

It is a principal object of this invention to provide a valve which may be opened or closed easily and quickly even though there is a very great fluid pressure in the line.

A further object of the invention is to provide a valve, wherein the frictional contact between the movable plug and the plug seat is reduced to a minimum. Further objects are to provide a manually operable valve having special means to allow easy and positively controlled opening and closing thereof, even though said valve is in flow communication with fluid under high pressure; and to provide a valve adapted for use with manually operable fire nozzles, and the like, and which is comparatively simple and inexpensive to manufacture and assemble. Further objects and advantages will become apparent upon reference to the accompanying specifications and drawings.

In the drawings similar characters of reference represent corresponding parts in the several views.

Fig. 1 is a longitudinal sectional view through a nozzle embodying the invention.

Fig. 2 is a sectional view, taken on line 2—2 of Fig. 1.

Fig. 3 is a sectional view, taken on line 3—3 of Fig. 1.

Fig. 4 is a perspective view of the plug.

Fig. 5 is a perspective view of the seal piece.

Fig. 6 is a perspective view of the seal piece turned 180° from the position of Fig. 5.

Fig. 7 is a perspective view of the yoke member.

Fig. 8 is a side elevational view, partly in section, of the valve assembly, showing the seal piece toward the plug.

Fig. 9 is a sectional view, taken on line 9—9 of Fig. 8.

Fig. 10 is a vertical sectional view of a modified form of the invention.

A nozzle, such as a fire hose nozzle, is represented generally at A and comprises a fluid inlet 2 and outlet 3 in communication with a hollow body 4 and valve actuating handle member 5. The valve assembly comprises a generally circular barrel 6, formed in the body 4 of the nozzle and in flow communication with the inlet and outlet sides of the nozzle. A plug 7, having a bore or duct 8 formed transversely therethrough for registering with the inlet and outlet sides of the nozzle, is rotatably mounted in said barrel 6. The plug is formed with opposite flat sides 9 and 10 and opposite sides 11 rounded in substantial conformity with the curvature of the barrel. It is noted that the plug is of slightly less diameter than the barrel to form an annular passage 12 between the plug and barrel wall.

The plug 7 is provided with a centering stud 13 on one end adapted to nest pivotally in a centering well 14, formed in the body 4. The opposite end of the plug is keyed to the handle member 5 through a screw 15, or the like. Arcuate movement of the handle 5 may rotate plug 7 at least 90° relative to barrel 6 in order to open or close communication between the inlet and outlet sides of the nozzle, as will hereinafter appear. Suitable packing 16 may be provided.

A seal piece 17, chordal in configuration and having the sealing side 18 thereof rounded in conformity with the curvature of the barrel wall, is disposed adjacent to the flat side 10 of plug 7 and spaced therefrom. The flat side of the seal piece 17 is provided with a depression 19a, in which is mounted a spring tension member 19 which bears against side 10 and normally urges seal piece 17 away from plug 7 and toward the barrel wall. It is noted that the rounded face 18 of seal piece 17 is large enough in area to cover completely and seal off the outlet duct of nozzle A. A transverse projecting flange 20 is provided on one end of the seal piece 17 for a purpose shortly to appear.

A yoke member, generally indicated at 21, is pivotally mounted on at least one end of the plug 7 and comprises, preferably, a plate 22 formed with a generally arcuate cut-out 23, a center hole 25 for reception of centering pin 13 and which is large enough to allow the yoke member to slide relative to the plug. A pair of oppositely disposed, arcuate slots 24 are provided in the plate near the sides thereof for registering with pins 26, rigidly carried by said plug and projected from the end thereof.

The yoke member 21 is positioned on the end of the plug so that the cut-out 23 projects over the side 10 of said plug and receives flange 20 therein. As the plug 7 is rotated, through the action of the handle member 5, a pin 26 forces plate 22 and seal piece 17 away from the barrel wall. Initial rotation of the plug 7 causes a sliding movement of yoke member 21 relative to plug 7. The yoke is engaged by a pin 26 and thereby causes seal piece 17 to move or tilt toward plug 7 (see Figs. 8 and 9).

The operation of the invention will now be described. It is assumed that the valve is closed, i. e. the seal piece 17 is positioned over outlet duct 3 and the plug duct 8 is positioned at right angles to the longitudinal axis of the nozzle (Fig. 3). Water or other fluid under pressure feeds through inlet 2, into barrel 6, and thence around plug 7, through passage 12 and between the flat side 10 of the plug and seal piece 17 which is normally spaced from said plug by means of spring member 19.

The fluid pressure exerted against seal piece 17 is very considerable, and heretofore rotation of the plug, to allow fluid access to the outlet duct, was very difficult to control manually, particularly when dealing with high fluid pressures or large volume nozzles.

The present invention obviates the difficulty of opening the outlet duct by reason of the fact that the seal piece 17 is moved or tilted toward the flat side 10 of the plug 7 during initial rotation of said plug, as previously set forth. When the seal piece is tilted away from outlet duct and barrel wall (Figs. 8 and 9), there remains only a relatively small area of frictional engagement between the rounded face 18 of the seal piece and the barrel wall (Fig. 8). Continued rotation of the plug and connected seal piece opens the outlet duct and brings bore 8 into registry therewith. Hence the outlet duct may be opened, even with high fluid pressure in the line, easily and under positive control.

When the plug is rotated in a reverse direction, the seal piece is moved or tilted toward the plug, frictional resistance between the seal piece and the barrel wall is lessened, and the outlet duct may be easily closed by continued rotation of the plug and connected seal piece to bring the seal piece into position to cover the outlet duct.

It may be expedient to provide a yoke member, or equivalent means, on both ends of the plug, in some instances, in order to move the seal piece away from the barrel wall altogether upon initial rotation of the plug. Fig. 10 discloses a plug 7 equipped with oppositely disposed yoke members 21 and a seal piece 31 provided with flanges 32 on each end thereof for engagement with the said yoke members.

The invention has been described herein as applied to a nozzle, such as a fire nozzle, and it is understood that it may be applied to hydrants, taps and other fluid closures or guides. The term "nozzle" as used in the specification and claims is understood to be used generically.

While we have described our invention in more or less specific detail for purposes of example and illustration, it is understood that the invention is not limited merely to uses and details of structure herein set forth. Changes, alterations and modifications, for example, in the means to connect the plug and seal piece together and in the details of structure of the plug, seal piece, and aforementioned means may be practiced within the scope of the appended claims.

We claim:

1. In a nozzle having a hollow body and fluid inlet and outlet ducts in communication therewith, a plug mounted rotatably in said body and spaced from an inside wall thereof, said plug having a bore therethrough, means to rotate said plug, a seal piece to cover an outlet duct, a yoke member pivotally mounted on each end of said plug, means carried by said plug to coact with said yoke members to limit pivotal movement thereof relative to said plug, and means formed in said yoke members to engage opposite ends of said seal piece whereby, upon rotation of said plug, said seal piece is moved free from engagement with said wall of said hollow body.

2. In a nozzle having a hollow body and fluid inlet and outlet ducts in communication therewith, a plug mounted rotatably in said body and spaced from an inside wall thereof, said plug having a bore therethrough, means to rotate said plug, a seal piece to cover an outlet duct, means interposed between said plug and said seal piece to urge normally said seal piece toward a wall of said hollow body and away from said plug, a yoke member pivotally mounted on each end of said plug, means carried by said plug to coact with said yoke members to limit pivotal movement thereof relative to said plug, and means formed in said yoke members to engage opposite ends of said seal piece whereby, upon rotation of said plug, said seal piece is moved free of engagement with said wall of said hollow body.

3. In a nozzle having a hollow body and fluid inlet and outlet ducts in communication therewith, a plug mounted rotatably in said body and spaced from an inside wall thereof, said plug having a bore therethrough, means to rotate said plug, a seal piece having flanges at opposite ends thereof to cover an outlet duct, means to urge normally said seal piece toward a wall of said hollow body and away from the said plug, a yoke member pivotally mounted on each end of said plug, pins carried by said plug to coact with arcuate slots formed in said yoke members to limit pivotal movement of said yoke members relative to said plug, and means formed in said yoke members to engage said flanges of said seal piece whereby upon rotation of said plug said seal piece is moved toward said plug and free of engagement with said wall of said hollow body.

4. In a nozzle having a hollow body and fluid inlet and outlet ducts in communication therewith, a plug mounted rotatably in said body and spaced from an inside wall thereof, said plug having a bore therethrough, means to rotate said plug, a seal piece to cover an outlet duct disposed in said hollow body and normally contacting a wall of said hollow body, means comprising yoke connections to connect opposite ends of said plug to corresponding opposite ends of said seal piece and arranged to move said seal piece bodily towards said plug and free of engagement with said wall of said hollow body.

GEORGE E. SLEEPER, Jr.
GORDON W. McPEAK.

REFERENCES CITED

The following references are of record in the file of this patent:

UNITED STATES PATENTS

| Number | Name | Date |
| --- | --- | --- |
| 810,951 | Larkin | Jan. 31, 1906 |
| 2,261,535 | Wheatley | Nov. 4, 1941 |
| 2,283,281 | Ohls | May 19, 1942 |
| 2,314,732 | Ohls | Mar. 23, 1943 |
| 2,385,993 | Johnson | Oct. 2, 1945 |